US012002601B2

(12) United States Patent
Wang et al.

(10) Patent No.: US 12,002,601 B2
(45) Date of Patent: Jun. 4, 2024

(54) STRESS-RESISTANT, CREEP-RESISTANT, HIGH-TEMPERATURE RESISTANT AND HIGH-INSULATION SHEATH MATERIAL FOR MAGLEV TRAIN CABLE, AND MANUFACTURING METHOD AND USE THEREOF

(71) Applicant: Anhui Jianzhu University, Hefei (CN)

(72) Inventors: Ping Wang, Hefei (CN); Shang Gao, Hefei (CN); Yong Zhong, Hefei (CN); Wenxiu Liu, Hefei (CN); Tao Hong, Hefei (CN); Tao Song, Hefei (CN); Long Chen, Hefei (CN); Bin Ye, Hefei (CN); Yunsheng Ding, Hefei (CN); Li Yang, Hefei (CN); Jie Song, Hefei (CN); Hongyu Tian, Hefei (CN); Haibing Lu, Hefei (CN)

(73) Assignee: Anhui Jianzhu University, Hefei (CN)

( * ) Notice: Subject to any disclaimer, the term of this patent is extended or adjusted under 35 U.S.C. 154(b) by 0 days.

(21) Appl. No.: 18/496,779

(22) Filed: Oct. 27, 2023

(65) Prior Publication Data

US 2024/0062935 A1 Feb. 22, 2024

Related U.S. Application Data

(63) Continuation of application No. PCT/CN2023/095747, filed on May 23, 2023.

(30) Foreign Application Priority Data

Jul. 1, 2022 (CN) ......................... 202210775361.8

(51) Int. Cl.

| | |
|---|---|
| ***H01B 19/04*** | (2006.01) |
| ***H01B 3/44*** | (2006.01) |
| ***H01B 3/46*** | (2006.01) |
| *B61L 15/00* | (2006.01) |

(52) U.S. Cl.

CPC ............. *H01B 19/04* (2013.01); *H01B 3/441* (2013.01); *H01B 3/465* (2013.01); *B61L 15/0036* (2013.01); *B61L 2210/04* (2013.01)

(58) Field of Classification Search

CPC .......... H01B 7/295; H01B 3/441; H01B 3/28; H01B 3/443; H01B 7/18

See application file for complete search history.

(56) References Cited

U.S. PATENT DOCUMENTS

| | | | | |
|---|---|---|---|---|
| 5,378,539 | A | 1/1995 | Chen | |
| 2007/0015893 | A1* | 1/2007 | Hakuta | C08L 83/00 528/34 |
| 2011/0278039 | A1 | 11/2011 | Basfar et al. | |
| 2017/0210888 | A1* | 7/2017 | An | C08L 61/12 |

FOREIGN PATENT DOCUMENTS

| | | | |
|---|---|---|---|
| CN | 105367883 | A | 3/2016 |
| CN | 106589964 | A | 4/2017 |
| CN | 106633341 | A | 5/2017 |
| CN | 108102207 | A | 6/2018 |
| CN | 115011021 | A | 9/2022 |

* cited by examiner

*Primary Examiner* — Krystal Robinson

(74) *Attorney, Agent, or Firm* — Westbridge IP LLC

(57) ABSTRACT

Disclosed are a stress-resistant, creep-resistant, high-temperature resistant and high-insulation sheath material for a maglev train cable, and a manufacturing method and use thereof. A multiple chemical crosslinking structure is constructed by blending a functional polyvinylsilicone grease with ultra-high molecular weight polyethylene (UHMWPE) and a ceramicized silicone rubber as a cable material matrix and using electron beam irradiation. In addition, organic/inorganic fillers in the matrix can form physical crosslinking points in the material. A physical-chemical dual crosslinking structure is constructed in the matrix, which can limit the motion and relaxation of molecular chains and improve the interaction between the insulation layer and sheath layer and refractory layers such as fillers and mica tapes to avoid the relative displacement during the laying and operation and improve the high-temperature resistance, creep resistance and stress relaxation resistance of a UHMWPE cable sheath material.

5 Claims, No Drawings

STRESS-RESISTANT, CREEP-RESISTANT, HIGH-TEMPERATURE RESISTANT AND HIGH-INSULATION SHEATH MATERIAL FOR MAGLEV TRAIN CABLE, AND MANUFACTURING METHOD AND USE THEREOF

CROSS-REFERENCE TO RELATED APPLICATION

This application is a continuation of International Application No. PCT/CN2023/095747, filed on May 23, 2023, which claims priority to Chinese Patent Application No. 202210775361.8, filed on Jul. 1, 2022. All of the aforementioned applications are incorporated herein by reference in their entireties.

TECHNICAL FIELD

The present disclosure belongs to the field of polymer materials technology and science, and particularly relates to a stress-resistant, creep-resistant, high-temperature resistant and high-insulation sheath material for a 620 km/h maglev train, and a manufacturing method and use thereof.

BACKGROUND

The successful operation of a 620 km/h maglev train has greatly filled a speed gap between China's high-speed rail and air transportation, but it also puts forward higher requirements for structural size, electrical performance, mechanical and physical performance, and safety performance of cables. It is necessary to achieve long-term stable operation of materials under high temperature, high stress and strong twisting environments.

In Patent Application Publication CN108239322A, high-density polyethylene is used as a carrier to be mixed with carbon black and extruded together with different polyethylene resins so as to prepare high-hardness, wear-resistance high-toughness polyethylene sheaths, thereby improving the hardness and cracking resistance time of the material. In Patent Application Publication CN104774363A, a blended masterbatches is prepared from vinyl tris(2-methoxyethoxy) silane, tert-butyl benzoyl peroxide and polyethylene, and then blended with a low-density polyethylene matrix, and a silane crosslinked polyethylene cable material is prepared in a closed space with water under the sun so that the cable has a high crosslinking degree. However, the improvement of material performance in the above studies is relatively single, and has not been mentioned in terms of high temperature resistance, stress resistance, etc. The scope of application is relatively low, making it difficult to meet the application requirements in complex environments. At present, the technology related to maglev trains in China is mostly monopolized by foreign countries, so it is of great significance to develop sheath materials with independent intellectual property rights that are resistant to stress, creep, high temperature and high insulation.

SUMMARY

The present disclosure provides a stress-resistant, creep-resistant, high-temperature resistant and high-insulation sheath material for a maglev train cable, and a manufacturing method and use thereof. The sheath material comprises the raw materials in parts by weight: 100-150 parts of ultra-high molecular weight polyethylene (UHMWPE); 50-80 parts of functional polyvinylsilicone grease; 50-80 parts of ceramicized silicone rubber; 120-200 parts of phosphorus nitrogen flame retardant; 30-50 parts of reinforcing fillers; 5-10 parts of vulcanizing agent; 1-5 parts of vulcanization accelerator; 1-5 parts of coupling agent; 5-10 parts of compatibilizer; 2-5 parts of lubricant; 1-3 parts of antioxidant; and 1-2 parts of antistatic agent. A multiple chemical crosslinking structure is constructed by blending of a polyvinylsilicone grease with UHMWPE and a ceramicized silicone rubber as a cable material matrix and using electron beam irradiation. In addition, organic/inorganic fillers in the matrix can form physical crosslinking points in the material. A physical-chemical dual crosslinking structure is constructed in the matrix, where the multiple chemical and physical crosslinking structure can limit the motion and relaxation of molecular chains and improve the interaction between the insulation layer and sheath layer and refractory layers such as fillers and mica tapes to avoid the relative shift during the laying and operation and improve the high-temperature resistance, creep resistance and stress relaxation resistance of a UHMWPE cable sheath material.

A specific solution is as follows.

A stress-resistant, creep-resistant, high-temperature resistant and high-insulation sheath material for a maglev train cable, comprising the raw materials in parts by weight:

- 100-150 parts of UHMWPE;
- 50-80 parts of functional polyvinylsilicone grease;
- 50-80 parts of ceramicized silicone rubber;
- 120-200 parts of phosphorus nitrogen flame retardant;
- 30-50 parts of reinforcing fillers;
- 5-10 parts of vulcanizing agent;
- 1-5 parts of vulcanization accelerator;
- 1-5 parts of coupling agent;
- 5-10 parts of compatibilizer;
- 2-5 parts of lubricant;
- 1-3 parts of antioxidant; and
- 1-2 parts of antistatic agent;
- the functional polyvinylsilicone grease is a four-arm eight-membered ring star-shaped polymer represented by formula (I) and containing a large amount of unsaturated bonds (I)

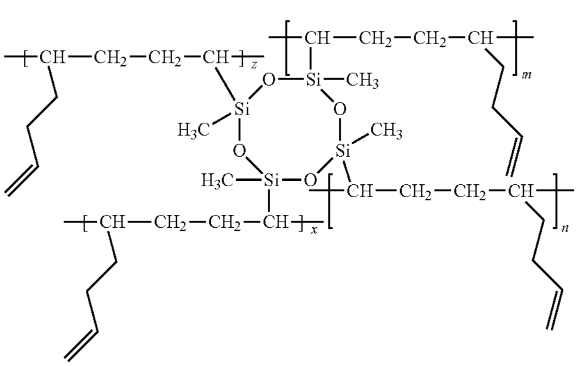

where z, x, m and n are numbers of repeated units, and are independently integrals between 300 and 500; where the sheath material is prepared by performing melting blend on the UHMWPE, functional polyvinylsilicone grease, ceramicized silicone rubber, phosphorus nitrogen flame retardant, reinforcing filler, coupling agent, compatibilizer, lubricant, antioxidant and antistatic agent in ratios to obtain blended masterbatches and then performing melting blend on the blended masterbatches, vulcanizing agent and vulcanization accelerator to obtain pre-crosslinked masterbatches.

Further, the UHMWPE has a density of 0.92-1.08 g/cm$^3$, a boiling point of 120-140° C., a melt flowing rate of 0.05-0.3 g/10 min under the condition of 190° C./2.16 kg, a molecular weight of $4\times10^6$ g/mol-$10^7$ g/mol, a shore hardness (D) of 60-65 and a notch impact strength of 50-65 kJ/m$^2$;

- the ceramicized silicone rubber has a density of 1.13-1.52 g/cm$^3$, a shore hardness (A) of 41-75, an elongation at break of 200-540% and a tensile strength of 5.5-15 MPa;
- the phosphorus nitrogen flame retardant is selected from any one or a mixture of more of triethyl phosphate (TEP), pentaerythritol cage phosphate (PEPA), 9,10-dihydro-9-oxyphenanthroline-10-oxide (DOPO) and melamine cyanurate (MCA), has a density of 0.92-1.9 g/cm$^3$, a relative molecular weight of 170-240, a phosphorus content of 14-30 wt % and a nitrogen content of 15-30 wt %;
- the reinforcing filler is selected from any one or a mixture of more of mica, clay, talc powder, synthetic silicate, kaolin and carbon nanotubes;
- the vulcanizing agent is selected from any one or a mixture of more of 2,5-dimethyl-2,5-bis(peroxy-tert-butyl)hexane (AD), benzoyl peroxide (BPO), di-tert-butyl peroxide (DTBP), diisopropyl peroxide (DCP) and diisopropyl peroxydicarbonate;
- the vulcanization accelerator is any one or a mixture of more of tetramethylthiuram disulfide (TMTD), ethylene thiourea (ETU) and tellurium diethyldithiocarbamate (TDEC);
- the coupling agent is any one or a mixture of more of a silane coupling agent, a titanate coupling agent, an aluminate coupling agent and an organic complex coupling agent;
- the compatilizer is any one or a mixture of more of ethylene-octene copolymer, glycidyl methacrylate grafted ethylene-vinyl acetate, maleic anhydride grafted ethylene-vinyl acetate and glycidyl methacrylate grafted ethylene-octene copolymer;
- the lubricating agent is any one or a mixture of more of paraffin wax, polyethylene wax, and oxidized polyethylene wax;
- the antioxidant is any one or a mixture of more of 6-ethoxy-2,2,4-trimethyl-1,2-dihydroquinoline, N-phenyl-N'-cyclohexyl-p-phenylenediamine and N—N'-diphenyl-p-phenylenediamine; and
- the antistatic agent is a fusible salt having a cationic organic structure.

A method of manufacturing the sheath material, comprising the following steps:

- adding UHMWPE, a functional polyvinylsilicone grease, a ceramicized silicone rubber, a phosphorus nitrogen flame retardant, a reinforcing filler, a coupling agent, a compatibilizer, a lubricant, an antioxidant and an antistatic agent into an internal mixer in ratios for 10 min of melting blend under the conditions of 180° C. and 50 rpm, then cooling and drying, subsequently placing the above mixture in a twin-screw extruder at 130-180° C. for melting blend and extrusion, and then cooling and drying to obtain blended masterbatches;
- adding the above masterbatches together with a vulcanizing agent and a vulcanization accelerator into a high-speed mixer for 15 min of blending at 2500-4000 r/min, then stopping the blending, then placing the obtained mixture in a twin-screw extruder at 180° C. for melting blend and extrusion, and then cooling and drying to obtain pre-crosslinked masterbatches; and
- placing the pre-crosslinked masterbatches in a wire and cable extruder at 130-180° C. for melting and extrusion to obtain a pre-crosslinked cable; and finally irradiating the pre-crosslinked cable under the conditions that a beam pressure is 1.5-2 MeV, a beam current is 20 mA, and an irradiation dose is 400 kGy for 8 min to obtain the cable finished product.

Further, the method also comprises preparing the functional polyvinylsilicone grease, and specific steps are as follows:

- weighing a metallocene catalyst $(nBuCp)_2ZrCl_2$ in a nitrogen glove box and completely dissolving the catalyst into toluene, adding a solvent, 6-chloro-1-hexene, trimethylaluminum (MAO) and a metallocene catalyst that are accurately weighed to a vacuum reactor in a nitrogen environment, stirring and heating to 85° C., adding 2,4,6,8-tetramethyl-2,4,6,8-tetravinylcyclotetrasiloxane after the system temperature rises to a reaction temperature, and stopping introduction after 8 h of reaction, pouring a copolymer into a glass container after the temperature drops to a room temperature, slowly adding an excessive 5% hydrochloric acid ethanol solution into the glass container to stop the reaction, filtering, and performing vacuum drying at 80° C. for 12 h to obtain a solid copolymer.

The above copolymer (1) together with hydrothermal reagents, namely 5% NaOH, KOH, $NH_3{\cdot}H_2O$, 2.5% $Na_2CO_3$ solution and a 5% ethanol solution is placed in a hydrothermal reactor at the reaction temperature of 400° C. for 4 h to obtain a solid phase product (1) as the functional polyvinylsilicone grease.

(I)

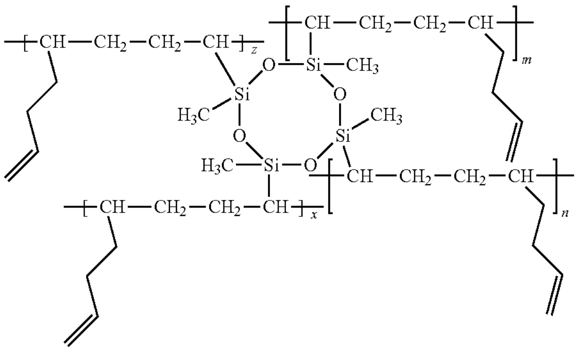

where z, x, m and n are numbers of repeated units, which are independently integrals between 300 and 500.

Further, a method of applying the sheath material is as follows:

- the material is applied to a 620 km/h maglev train, and operates stably for a long time in high temperature, high stress and strong twisting environments.

The present disclosure has the following beneficial effects.

1) The functional polyvinylsiloxane grease is a polymer containing a large number of unsaturated bonds and having an eight-membered cyclic structure. The eight-membered ring structure can effectively prevent the slipping of molecular chains, plays a role in resisting creep and stress relaxation, and a large number of double bonds can be used for chemical crosslinking to improve the crosslinking degree.

2) The fillers are introduced to construct physical cross-linking points, while initiating chemical crosslinking of double bonds through irradiation, further limiting the relaxation of molecular chains and improving the strength and toughness of the material. After irradiation crosslinking, the functional polyvinylsilicone grease can interact strongly with the ceramicized silicone rubber refractory layer, thereby reducing the relative displacement between the refractory layer and the insulation layer, achieving long-term stable operation of cables in high temperature, high stress and strong twisting environments, and improving the high-temperature, creep and stress relaxation resistance of the UHMWPE cable sheath material.

3) The following steps are further described, i.e., the above blended masterbatches, the vulcanizing agent and the vulcanization accelerator are added into a high-speed mixer for 15 min of blending at 3500 r/min, the blending is stopped, and then the mixture is placed in a twin screw extruder for melting blend and extrusion, the processing temperatures are respectively 100° C., 110° C., 120° C., 130° C., 135° C. and 140° C. from the material mouth to the mold mouth, after cooling and drying, pre-crosslinked masterbatches are obtained, the fillers are evenly dispersed in the matrix, at the same time, the generation efficiency of free radicals of the vulcanizing agent and the vulcanization accelerator is increased, and then the crosslinking degree is improved.

DETAILED DESCRIPTION OF THE EMBODIMENTS

Next, the present disclosure will be described in detail through specific examples, however, the scope of protection of the present disclosure is not limited to these examples.

The raw materials used in the following examples are as follows:

UHMWPE: ultra-high molecular weight polyethylene, with a density of 1.03 g/cm$^3$, a Rockwell hardness (R) of 58, a tensile strength of 46 MPa, elongation at break of 7%, a bending modulus of 2210 MPa, a bending strength of 43 MPa, a Vicat softening temperature of 130° C., a dielectric strength of 60 kV/mm and a dielectric constant of 2.5, which is L4420 from Mitsui Chemical L4420, Japan.

Functional polyvinylsiloxane grease: a four-arm eight-membered cyclic star-shaped polymer containing a large number of unsaturated bonds, which is prepared by the following steps: weighing a metallocene catalyst $(nBuCp)_2ZrCl_2$ in a nitrogen glove box and completely dissolving the catalyst into toluene; sequentially adding 100 ml of n-heptane, 60 ml of 6-chloro-1-hexene, 0.126 g of trimethylaluminum (MAO) and 0.18 g of metallocene catalyst that are accurately weighed into a vacuum reactor in a nitrogen environment, stirring, and heating to 85° C.; after the system temperature rises to the reaction temperature, adding 15 ml of 2,4,6,8-tetramethyl-2,4,6,8-tetravinylcyclotetrasiloxane and stopping the introduction after 8 h of reaction, pouring the copolymer into a glass container after the temperature drops to a room temperature, and slowly adding an excessive 5% hydrochloric acid ethanol solution into the container to stop the reaction, filtering, and drying in vacuum at 80° C. for 12 h to obtain a solid copolymer; and placing the above copolymer (1) together with hydrothermal reagents (5% NaOH, KOH, $NH_3 \cdot H_2O$, 2.5% $Na_2CO_3$ solution and 5% ethanol solution) in a hydrothermal reactor in a ratio of the copolymer to the hydrothermal reagents of 1:20 at the reaction temperature 400° C. for 4 h to obtain a solid phase product (I) as the functional polyvinylsilicone grease.

(I)

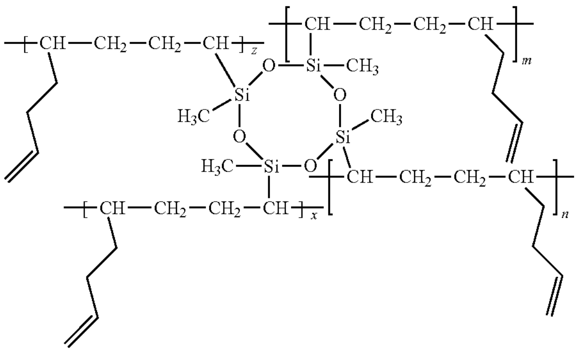

Ceramicized silicone rubber: a Shore hardness (A) of 70, a density of 1.46 g/cm$^3$, an elongation at break of 447%, a tensile strength of 10.7 MPa, a dielectric constant of 28, an oxygen index of 38, which is TCHS-0001S from Guangdong Antop Polymer Technology Co., Ltd.

Phosphorus nitrogen flame retardant: a mixture of triethyl phosphate (TEP), 9,10-dihydro-9-oxyphenanthrene-10 oxide (DOPO) and melamine cyanurate (MCA) in a mass ratio of 1:1:1, which are from Shanghai Aladdin Biochemical Technology Co., Ltd.

Reinforcing filler: a mixture of mica and talc powder in a mass ratio of 1:1. Mica is from Anhui Gerui New Material Technology Co., Ltd. GM-3; talcum powder is from Quanzhou Xufeng Powder Raw Materials Co., Ltd. BHS-8860.

Vulcanizing agent: 2,5-dimethyl-2,5-bis(peroxy-tert-butyl) hexane (AD), which is from Shanghai Aladdin Biochemical Technology Co., Ltd.

Vulcanization accelerator: tetramethylthiuram disulfide (TMTD), which is from Shanghai Aladdin Biochemical Technology Co., Ltd.

Coupling agent: y-mercaptopropyl triethoxysilane, which is from Shanghai Aladdin Biochemical Technology Co., Ltd.

Compatibilizer: a mixture of glycidyl methacrylate grafted ethylene-vinyl acetate (EVA-g-GMA), maleic anhydride grafted ethylene-vinyl acetate (EVA-g-MAH) and glycidyl methacrylate grafted ethylene-octene copolymer (POE-g-GMA) in a mass ratio of 1:1:3. EVA-g-GMA is from Sumitomo BF-7M, Japan, EVA-g-MAH is from Akoma T9318, France, and POE-g-GMA is from DuPont N493, the United States.

Lubricant: paraffin wax, which is from Emilsogen P from Klein, Switzerland.

Antioxidant: a mixture of 6-ethoxy-2,2,4-trimethyl-1,2-dihydroquinoline and N-phenyl-N'-cyclohexyl-phenylenediamine in a mass ratio of 2:1, which is from Shanghai Aladdin Biochemical Technology Co., Ltd.

Antistatic agent: 1-allyl-3-vinylimidazole tetrafluoroborate, which is from Shanghai Chengjie Chemical Co., Ltd.

EVA: ethylene-vinyl acetate, with a melt index of 20 g/10 min, a density of 0.95 g/cm$^3$, a VA content of 28 wt % and a melting point of 69° C., which is from Korean Lotte Chemical VA800.

The mass fractions of various raw materials in the following examples are seen in Table 1.

Table 1 Raw materials and amounts of stress-resistant, creep-resistant, high-temperature resistant and high-insulation sheath material for maglev train cable (based mass fraction)

| Component | Example1 | Example2 | Example3 | Comparative example 1 | Comparative example 2 | Comparative example 3 | Comparative example 4 |
|---|---|---|---|---|---|---|---|
| UHMWPE | 120 | 120 | 140 | 120 | 120 | 120 | 120 |
| Functional polyvinylsilicone grease | 50 | 70 | 60 | 0 | 0 | 50 | 50 |
| Ceramicized silicone rubber | 50 | 70 | 80 | 0 | 50 | 0 | 50 |
| EVA | 0 | 0 | 0 | 50 | 0 | 50 | 0 |
| Phosphorus nitrogen flame retardant | 140 | 140 | 160 | 140 | 140 | 140 | 140 |
| Reinforcing filler | 30 | 30 | 40 | 30 | 30 | 30 | 30 |
| Vulcanizing agent | 5 | 10 | 10 | 5 | 5 | 5 | 5 |
| Vulcanization accelerator | 3 | 5 | 5 | 3 | 3 | 3 | 3 |
| Coupling agent | 3 | 5 | 5 | 3 | 3 | 3 | 3 |
| Compatibilizer | 3 | 3 | 3 | 3 | 3 | 3 | 3 |
| Lubricant | 3 | 3 | 3 | 3 | 3 | 3 | 3 |
| Antioxidant | 1 | 1 | 1 | 1 | 1 | 1 | 1 |
| Antistatic agent | 1 | 1 | 1 | 1 | 1 | 1 | 1 |

Example 1

Raw materials and formulas in this example are seen in Table 1. The preparation method was carried out according to the following steps:

UHMWPE, a functional polyvinylsilicone grease, a ceramicized silicone rubber, a phosphorus nitrogen flame retardant, a reinforcing filler, a coupling agent, a compatibilizer, a lubricant, an antioxidant and an antistatic agent were added into an internal mixer in ratios for 10 min of melting blend under the conditions of 180° C. and 50 rpm, then the above mixture was cooled, dried and then placed in a twin-screw extruder at 130-180° C. for melting blend and extrusion, and then cooled and dried to obtain blended masterbatches.

The above masterbatches together with a vulcanizing agent and a vulcanization accelerator were added into a high-speed mixer for 15 min of blending at 3500 r/min, then the blending was stopped, then the obtained product was placed in a twin-screw extruder for melting blend and extrusion, the processing temperatures were respectively 100° C., 110° C., 120° C., 130° C., 135° C. and 140° C. from the material mouth to the mold mouth, and then the above mixture was cooled and dried to obtained pre-crosslinked masterbatches.

The pre-crosslinked masterbatches were placed in a wire and cable extruder for melting and extrusion on a cable conductor core, the temperature of an inlet was 130° C., the temperature of a first zone was 130-140° C., the temperature of a second zone was 140-150° C., the temperature of a third zone was 150-160° C., the temperature of a fourth zone was 160-170° C., the temperature of a fifth zone was 170-180° C., and the temperature of an outlet was 175° C., the surface of a core of a cable conductor was wrapped with a sheath; and finally the wrapped core was irradiated for 8 min under the conditions that a beam pressure was 1.5-2 MeV, a beam current was 20 mA, and an irradiation dose was 400 kGy to obtain the sheath material.

Example 2

Raw materials and formulas in this example are seen in Table 1, and the preparation process is the same as that in example 1.

Example 3

Raw materials and formulas in this example are seen in Table 1, and the preparation process is the same as that in example 1.

Comparative Example 1

Raw materials and formulas in this comparative example are seen in Table 1, and the preparation process is the same as that in example 1

Comparative Example 2

Raw materials and formulas in this comparative example are seen in Table 1, and the preparation process is the same as that in example 1

Comparative Example 3

Raw materials and formulas in this comparative example are seen in Table 1, and the preparation process is the same as that in example 1

Comparative Example 4

Raw materials and formulas in this example are seen in Table 1. The preparation process was carried out according to the following steps:

UHMWPE, a functional polyvinylsilicone grease, a ceramicized silicone rubber, a phosphorus nitrogen flame retardant, a reinforcing filler, a vulcanizing agent, a vulcanization accelerator, a coupling agent, a compatibilizer, a lubricant, an antioxidant and an antistatic agent were added into an internal mixer in ratios for 10 min of melting blend under the conditions of 180° C. and 50 rpm, then the above mixture was cooled, dried and then placed in a twin-screw extruder for melting blend and extrusion, the processing temperatures were respectively 100° C., 110° C., 120° C., 130° C., 135° C. and 140° C. from the material mouth to the mold mouth, and then the above mixture was cooled and dried to obtain blended masterbatches.

The pre-blended masterbatches were placed in a wire and cable extruder for melting and extrusion on a cable conductor core, the temperature of an inlet was 130° C., the temperature of a first zone was 130-140° C., the temperature of a second zone was 140-150° C., the temperature of a third zone was 150-160° C., the temperature of a fourth zone was 160-170° C., the temperature of a fifth zone was 170-180° C., and the temperature of an outlet was 175° C., and finally the wrapped core was irradiated for 8 min under the conditions that a beam pressure was 1.5-2 MeV, a beam current was 20 mA, and an irradiation dose was 400 kGy to obtain the material The main performance indexes of the cable materials obtained in examples 1-3 and comparative examples 1-4 are seen in Table 2.

improve the insulation and fire resistance performance of the material. During the oil resistance test, the movement of molecular chains is limited and difficult to swell, thereby leading to an improvement in oil resistance performance. By comparing example 2 with example 1, it shows that the contents of the functional polyvinylsilicone grease and the ceramicized silicone rubber are proportionally increased, and the crosslinking degree of the materials is increased, thereby resulting in less deformation of the material when being subjected to external forces; the deformation can rapidly restore when the external forces are removed so as to enhance the interaction between the functional polyvi-

TABLE 2

Performance test results of examples and comparative examples

| Performance | Unit | Example 1 | Example 2 | Example 3 | Comparative example 1 | Comparative example 2 | Comparative example 3 | Comparative example 4 |
|---|---|---|---|---|---|---|---|---|
| Crosslinking degree | % | 83 | 96 | 92 | 52 | 59 | 80 | 74 |
| Relaxation time | s | 210 | 160 | 190 | 8200 | 7200 | 4430 | 1339 |
| Environmental stress cracking resistance time | h | 4200 | 5600 | 4700 | 230 | 462 | 677 | 1902 |
| Tensile strength | MPa | 62 | 77 | 72 | 38 | 41 | 49 | 53 |
| Elongation at break | % | 372 | 570 | 443 | 165 | 313 | 355 | 360 |
| 20° C. dielectric Constant | | 22 | 16 | 20 | 32 | 34 | 29 | 30 |
| Volume resistivity | Ω · m | $4.55 \times 10^{15}$ | $5.53 \times 10^{15}$ | $5.42 \times 10^{15}$ | $0.92 \times 10^{14}$ | $6.71 \times 10^{13}$ | $5.29 \times 10^{13}$ | $4.55 \times 10^{13}$ |
| Oxygen index | | 57 | 64 | 60 | 28 | 42 | 31 | 49 |
| Maximum service temperature | ° C. | 290 | 320 | 314 | 180 | 210 | 200 | 230 |
| Fire resistance test (dual burner supply, a flame temperature is greater than 900° C.) supply (8.7 kV, 90 min) 15 min) | | No breakdown | No breakdown | No breakdown | No pass | No pass | No pass | No pass |
| Fire resistance test (dual burner supply, a flame temperature is greater than 900° C.) supply (8.7 kV, 15 min) | | No breakdown | No breakdown | No breakdown | No pass | No pass | No pass | No pass |
| Fire resistance test (dual burner supply, a flame temperature is greater than 900° C.) Check the integrity of a sample after cooling (30.5 kV, 15 min) | | No breakdown | No breakdown | No breakdown | No pass | No pass | No pass | No pass |
| 135 ± 2° C., tensile strength change rate for 168 h heat aging | % | +10 | +23 | +16 | −9 | +3 | +8 | +5 |
| 135 ± 2° C., elongation at break change rate for 168 h heat aging | % | −7 | −2 | −6 | −22 | −17 | −10 | −15 |
| Mineral oil resistance: IRM902/(100 ± 2)°/72 h elongation at break change rate | % | −8 | −4 | −7 | −43 | −31 | −27 | −20 |
| Mineral oil resistance: IRM902/(100 ± 2)°/72 h tensile strength change rate | % | −12 | −7 | −9 | −46 | −23 | −20 | −18 |
| Fuel oil resistance: IRM903/(70 ± 2)°/168 h elongation at break change rate | % | −9 | −4 | −7 | −45 | −31 | −22 | −26 |
| Fuel oil resistance: IRM903/(70 ± 2)°/168 h tensile strength change rate | % | −6 | −4 | −10 | −42 | −29 | −19 | −22 |
| −40 ± 2° C. low-temperature bending test (d ≤ 12.5 mm) checks integrity | | No cracks | No cracks | No cracks | Cracks | Cracks | Cracks | Cracks |
| −40 ± 2° C. low-temperature extension test (d > 12.5 mm) | % | 95 | 143 | 117 | 23 | 25 | 34 | 47 |
| Ozone concentration 0.00015-0.00025%/(40 ± 2)° C./72 h check integrity | | No cracks | No cracks | No cracks | Cracks | Cracks | Cracks | Cracks |

The test results are as shown in Table 2. The comprehensive performance of example 2 is optimal. Due to a high crosslinking degree in the system and the presence of a rigid structure, the breakage of the molecular chain can be effectively prevented, and the strength and elongation at break of the material are improved. The functional polyvinylsilicone grease can interact strongly with the ceramicized silicone rubber refractory layer to reduce the relative displacement between the refractory layer and the insulation layer, and nylsilicone grease and the ceramicized silicone rubber refractory layer, leading to an improvement in the overall performance of the material. By comparing example 2 with example 3, it shows that due to the excess of UHMWPE and the ceramicized silicone rubber in example 3, the crosslinking degree of the material is decreased, and an interaction between the functional polyvinylsilicone grease and the refractory layer is weakened, thereby resulting in a decrease in comprehensive performance. By comparing example 2 to comparative example 1, it shows that in comparative example 1, the traditional EVA is used as a matrix, without the addition of the functional polyvinylsilicone grease and the ceramicized silicone rubber, thereby resulting in poor overall performance. By comparing example 2 with comparative examples 2 and 3, it shows that the combination of the functional polyvinylsilicone grease and the ceramicized silicone rubber is not used in formulations of comparative examples, thereby resulting in performance defects existing in the material. In conclusion, it exhibits the superiority of the formula designed in example 2.

Example 1 has the same formula as comparative example 4, but the preparation processes are different. In comparative example 4, due to one-step mixing, the dispersion effect of the filler is poor, and the generation efficiency of free radical during irradiation crosslinking is poor, thereby resulting in a decrease in crosslinking degree, and reflecting the superiority of the preparation process.

Based on the analysis of test data, it can be seen that the performance of the sheath material with stress resistance, creep resistance, high temperature resistance and high insulation for the maglev train cable has been significantly improved due to the following reasons.

Firstly, specific processing techniques result in uniform dispersion of fillers, enhancing the generation efficiency of free radicals during irradiation, and improving the crosslinking degree compared to traditional one-step methods.

Secondly, the circular structure in the functional polyvinylsiloxane can improve the strength of the material.

Thirdly, due to the unique star-shaped structure and a large number of unsaturated bonds of the functional polyvinylsilicone grease, a highly crosslinked body structure is formed after irradiation, this chemical crosslinking inhibits the slip of different molecular chains, while forming physical crosslinking points between fillers and limiting the movement of chain segments, however, the ring structure in the single molecular chain can also effectively prevent the breakage. This will reduce the deformation of the material when subjected to external forces, providing creep resistance. At the same time, when the external force is removed, the deformation will quickly recover and store energy.

Fourthly, after irradiation crosslinking, the functional polyvinylsilicone grease can interact strongly with the ceramicized silicone rubber refractory layer, reduces the relative displacement between the refractory layer and the insulation layer, and leads to an improvement in high-temperature resistance and other properties.

Lastly, the cross-linked structure can effectively prevent material swelling in oil and improve oil resistance. In addition, excessive double bonds in polyvinylsilicone grease can effectively prevent material aging and improve the performance of the material after aging testing.

In the present disclosure, the functional polyvinylsilicone grease with a specific structure is synthesized and the UHMWPE matrix is introduced by compounding functional polyvinylsilicone grease with the ceramicized silicone rubber. Through irradiation crosslinking, the comprehensive performance of the material is improved, thereby overcoming the problem of stress relaxation and creep that occur in traditional materials under high stress conditions, leading to a rapid decline in the performance of cables under actual operating conditions, and achieving long-term stable operation of cables under high temperature, high stress and strong twisting environments. The materials and related technologies can be applied to cables for 620 km/h maglev trains and related intelligent equipment.

Although the content of the present disclosure has been described in detail through the above preferred embodiments, it should be recognized that the above description should not be considered a limitation to the present disclosure. Any modifications, equivalent substitutions, and improvements made within the spirit and principles of the present disclosure should be included within the scope of protection of the present disclosure.

What is claimed is:

1. A stress-resistant, creep-resistant, high-temperature resistant and high-insulation sheath material for a maglev train cable, comprising the following raw materials in parts by weight:

100-150 parts of ultra-high molecular weight polyethylene (UHMWPE);
50-80 parts of functional polyvinylsilicone grease;
50-80 parts of ceramicized silicone rubber;
120-200 parts of phosphorus nitrogen flame retardant;
30-50 parts of reinforcing fillers;
5-10 parts of vulcanizing agent;
1-5 parts of vulcanization accelerator;
1-5 parts of coupling agent;
5-10 parts of compatibilizer;
2-5 parts of lubricant;
1-3 parts of antioxidant; and
1-2 parts of antistatic agent;

wherein the functional polyvinylsilicone grease is a four-arm eight-membered ring star-shaped polymer represented by formula (I) and containing a large amount of unsaturated bonds, (I)

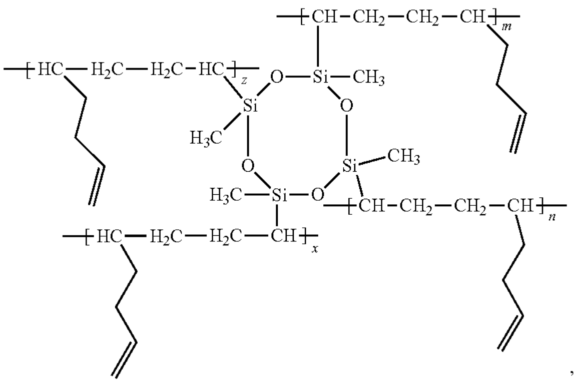

, wherein z, x, m and n are numbers of repeated units, and are independently integrals between 300 and 500; the sheath material is prepared by performing melting blend on the UHMWPE, functional polyvinylsilicone grease, ceramicized silicone rubber, phosphorus nitrogen flame retardant, reinforcing filler, coupling agent, compatibilizer, lubricant, antioxidant and antistatic agent in ratios to obtain blended masterbatches and then performing melting blend on the blended masterbatches, vulcanizing agent and vulcanization accelerator to obtain pre-crosslinked masterbatches.

2. The sheath material according to claim 1, wherein:

the UHMWPE has a density of 0.92-1.08 $g/cm^3$, a boiling point of 120-140° C., a melt flowing rate of 0.05-0.3 g/10 min under the condition of 190° C./2.16 kg, a molecular weight of $4\times10^6$ g/mol-$10^7$ g/mol, a shore hardness (D) of 60-65 and a notch impact strength of 50-65 kJ/$m^2$;

the ceramicized silicone rubber has a density of 1.13-1.52 g/$cm^3$, a shore hardness (A) of 41-75, an elongation at break of 200-540% and a tensile strength of 5.5-15 MPa;

the phosphorus nitrogen flame retardant is selected from any one or a mixture of more of triethyl phosphate (TEP), pentaerythritol cage phosphate (PEPA), 9,10-dihydro-9-oxyphenanthroline-10-oxide (DOPO) and melamine cyanurate (MCA), has a density of 0.92-1.9 g/$cm^3$, a relative molecular weight of 170-240, a phosphorus content of 14-30 wt % and a nitrogen content of 15-30 wt %;

the reinforcing filler is selected from any one or a mixture of more of mica, clay, talc powder, synthetic silicate, kaolin and carbon nanotubes;

the vulcanizing agent is selected from any one or a mixture of more of 2,5-dimethyl-2,5-bis (peroxy-tert-butyl) hexane (AD), benzoyl peroxide (BPO), di-tert-butyl peroxide (DTBP), diisopropyl peroxide (DCP) and diisopropyl peroxydicarbonate;

the vulcanization accelerator is any one or a mixture of more of tetramethylthiuram disulfide (TMTD), ethylene thiourea (ETU) and tellurium diethyldithiocarbamate (TDEC);

the coupling agent is any one or a mixture of more of a silane coupling agent, a titanate coupling agent, an aluminate coupling agent and an organic complex coupling agent;

the compatilizer is any one or a mixture of more of ethylene octene copolymer, glycidyl methacrylate grafted ethylene vinyl acetate, maleic anhydride grafted ethylene vinyl acetate and glycidyl methacrylate grafted ethylene-octene copolymer;

the lubricant is any one or a mixture of more of paraffin wax, polyethylene wax, and oxidized polyethylene wax;

the antioxidant is any one or a mixture of more of 6-ethoxy-2,2,4-trimethyl-1,2-dihydroquinoline, N-phenyl-N'-cyclohexyl-p-phenylenediamine and N—N'-diphenyl-p-phenylenediamine; and the antistatic agent is a fusible salt having a cationic organic structure.

3. A method of manufacturing the sheath material according to claim 1, comprising the following steps:

adding UHMWPE, a functional polyvinylsilicone grease, a ceramicized silicone rubber, a phosphorus nitrogen flame retardant, a reinforcing filler, a coupling agent, a compatibilizer, a lubricant, an antioxidant and an antistatic agent into an internal mixer in ratios for 10 min of melting blend under the conditions of 180° C. and 50 rpm, then cooling and drying, subsequently placing the above mixture in a twin-screw extruder at 130-180° C. for melting blend and extrusion, and then cooling and drying to obtain blended masterbatches;

adding the above masterbatches together with a vulcanizing agent and a vulcanization accelerator into a high-speed mixer for 15 min of blending at 2500-4000 r/min, then stopping the blending, then placing the obtained mixture in a twin-screw extruder at 100-180° C. for melting blend and extrusion, and then cooling and drying to obtain pre-crosslinked masterbatches; and placing the pre-crosslinked masterbatches in a wire and cable extruder at 130-180° C. for melting and extrusion to obtain a pre-crosslinked cable; and finally irradiating the pre-crosslinked cable under the conditions that a beam pressure is 1.5-2 MeV, a beam current is 20 mA, and an irradiation dose is 400 kGy for 8 min to obtain the cable finished product.

4. A method of applying the sheath material obtained by the manufacturing method according to claim 3, wherein the material is applied to cables for 620 km/h maglev trains and related intelligent equipment.

5. A method of applying the sheath material according to claim 1, wherein the material is applied to cables for 620 km/h maglev trains and related intelligent equipment.

* * * * *